United States Patent
Lee

(12) 
(10) Patent No.: US 9,955,721 B2
(45) Date of Patent: May 1, 2018

(54) FOOD FLAVORING APPARATUS

(71) Applicant: Dominique Lee, Jersey City, NJ (US)

(72) Inventor: Dominique Lee, Jersey City, NJ (US)

( * ) Notice: Subject to any disclaimer, the term of this patent is extended or adjusted under 35 U.S.C. 154(b) by 0 days. days.

(21) Appl. No.: 15/245,887

(22) Filed: Aug. 24, 2016

(65) Prior Publication Data

US 2017/0055563 A1 Mar. 2, 2017

Related U.S. Application Data

(60) Provisional application No. 62/208,971, filed on Aug. 24, 2015.

(51) Int. Cl.
| | |
|---|---|
| *A23P 20/18* | (2016.01) |
| *B05C 5/02* | (2006.01) |
| *A23L 7/191* | (2016.01) |

(52) U.S. Cl.
CPC .............. *A23P 20/18* (2016.08); *A23L 7/191* (2016.08); *B05C 5/0208* (2013.01); *A23V 2002/00* (2013.01)

(58) Field of Classification Search
CPC ..... A23P 20/18; A23L 7/191; A23V 2002/00; B05C 5/0208; B05C 5/02
USPC ........ 118/13, 19, 24; 99/323.5, 323.8, 323.9
See application file for complete search history.

(56) References Cited

U.S. PATENT DOCUMENTS

| | | | | |
|---|---|---|---|---|
| 3,783,820 | A * | 1/1974 | Hautly | A23L 27/70 118/19 |
| 4,576,108 | A * | 3/1986 | Socola | A23G 3/26 118/19 |
| 6,962,128 | B2 * | 11/2005 | Dove | A21C 15/002 118/13 |
| 8,276,504 | B2 * | 10/2012 | Korin | A23L 7/183 34/583 |
| 2009/0041915 | A1 * | 2/2009 | Biechteler | A23L 7/183 426/450 |

FOREIGN PATENT DOCUMENTS

WO WO-2013/076644 * 5/2013 ............ A23C 19/09

\* cited by examiner

*Primary Examiner* — Laura Edwards
(74) *Attorney, Agent, or Firm* — Dunlap Bennett & Ludwig PLLC

(57) ABSTRACT

A flavoring apparatus for flavoring each of a plurality of popped popcorn is provided. The flavoring apparatus may include a delivery apparatus and control mechanism that selectively steers the plurality of popped popcorn to a conveyor belt housed in the flavoring apparatus. A plurality of spaced-apart cutout recess along an outward facing surface of the conveyor belt are adapted to temporarily retain the conveyed popped popcorn in a spaced-apart arrangement. A plurality of spray nozzles may be positioned adjacent to cutout recesses so as to spray a liquid flavoring onto each of the plurality of spaced-apart popcorn from various spray angles as the popcorn is conveyed to a receptacle.

8 Claims, 3 Drawing Sheets

FOOD FLAVORING APPARATUS

CROSS-REFERENCE TO RELATED APPLICATION

This application claims the benefit of priority of U.S. provisional application No. 62/208,971, filed 24 Aug. 2015, the contents of which are herein incorporated by reference.

BACKGROUND OF THE INVENTION

The present invention relates to food flavoring apparatuses and, more particularly, an apparatus for flavoring each of a plurality of popped popcorn.

Current apparatus to flavor popcorn use only nozzles adapted to drip down into the top of the popcorn container, and so a customer cannot butter or otherwise evenly flavor the entire or a predetermined portion of the contents of the popcorn container.

During the buttering and/or flavoring process, at a typical movie theatre or event, a customer cannot add butter and/or flavoring to all the popcorn kernels in their popcorn container without spilling popcorn everywhere. Even if the customer tries to shake and flavor different portions of the popcorn container, the kernels in the middle and bottom of the container tend to be unevenly flavored or not flavored. Thus, the customer only usually enjoys the buttering and the flavoring at the top of the popcorn container, being reluctant to leave their event seating in the middle of a performance to go back to the concession stand to butter the middle and bottom kernels.

As can be seen, there is a need for an apparatus for flavoring each kernel of a container of popped popcorn.

SUMMARY OF THE INVENTION

In one aspect of the present invention, a food flavoring apparatus includes housing defining a flavoring enclosure; a conveyor belt housed in the flavoring enclosure; a plurality of spaced-apart recesses provided along an outward facing surface of the conveyor belt, wherein each recess is dimensioned and adapted to retain one popped popcorn therein; and a plurality of spray nozzles attached along the flavoring enclosure so as to be spaced apart and adjacent to the conveyor belt.

In another aspect of the present invention, the food flavoring apparatus includes a housing defining a flavoring enclosure; a delivery apparatus connected to an attachment point of the housing so that the delivery apparatus communicates with the flavoring enclosure, whereby popped popcorn is fed into the flavoring enclosure from the delivery apparatus; a conveyor belt housed in the flavoring enclosure, wherein the conveyor belt operably extends from adjacent the attachment point to adjacent a dispensing point; a plurality of spaced-apart recesses provided along an outward facing surface of the conveyor belt, wherein each recess is dimensioned and adapted to retain one popped popcorn therein; a plurality of spray nozzles attached along the flavoring enclosure so as to be spaced apart and adjacent to the conveyor belt, wherein each spray nozzle is selectively moveable between a range of spray angles; a control mechanism pivotally connected to the attachment point so as to move and be secured between a closed position and a range of open positions, steering popped popcorn from the delivery apparatus to the conveyor belt, wherein the range of open positions urges popped popcorn from the delivery apparatus across a range of non-vertical trajectories, and wherein the ranges of trajectories are associated with the range of open position, respectively; and a receptacle disposed so as to communicate with the dispensing point, whereby popcorn moving along the operable conveyor belt are urged into the receptacle.

These and other features, aspects and advantages of the present invention will become better understood with reference to the following drawings, description and claims.

DETAILED DESCRIPTION OF THE INVENTION

Figure 1:
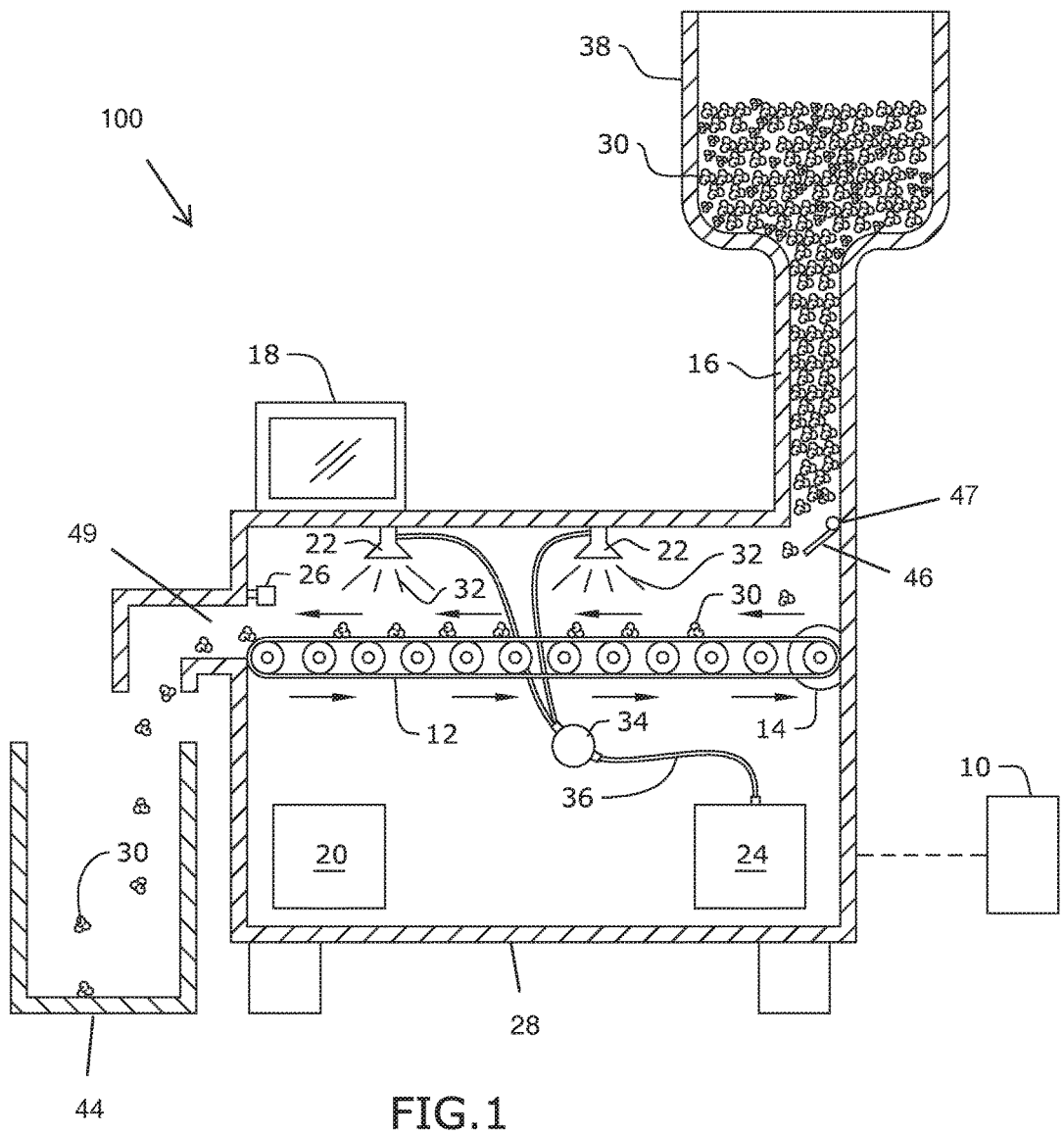
FIG. 1 is a schematic view of an exemplary embodiment of the present invention.
Figure 2:
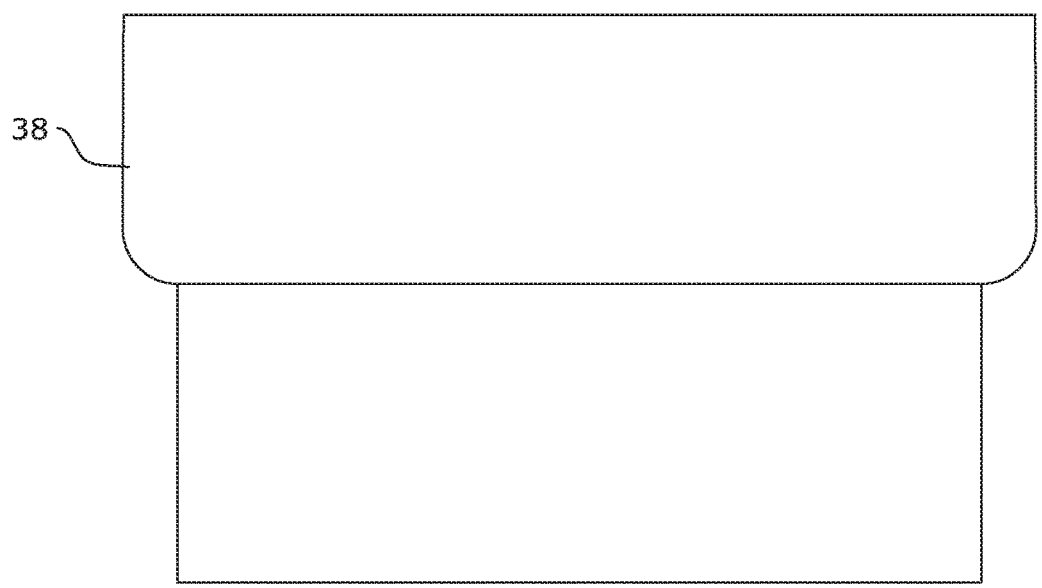
FIG. 2 is a front view of an exemplary embodiment of the present invention.
Figure 3:
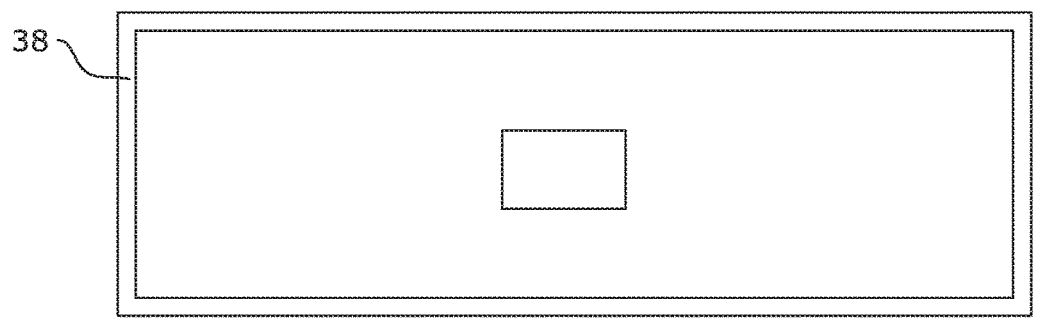
FIG. 3 is a top view of an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a flavoring apparatus for flavoring each of a plurality of popped popcorn. The flavoring apparatus may include a delivery apparatus and control mechanism that selectively steers the plurality of popped popcorn to a conveyor belt housed in the flavoring apparatus. A plurality of spaced-apart cutout recess along an outward facing surface of the conveyor belt are adapted to temporarily retain the conveyed popped popcorn in a spaced-apart arrangement. A plurality of spray nozzles may be positioned adjacent to cutout recesses so as to spray a liquid flavoring onto each of the plurality of spaced-apart popcorn from various spray angles as the popcorn is conveyed to a receptacle.

Referring now to FIGS. 1 through 4, the present invention may include a flavoring apparatus 100. The flavoring apparatus may include a hopper 38 operatively engaged with a conveyor belt 12 for receiving an article 30, which may include but not be limited to popcorn, in the hopper 38, conveying it along the conveyor belt 12 to a dispensing point 49 and into a receptacle 44. The conveyor belt 12 may be operatively connected to a power source 10 and a motor 14. The conveyor belt 12 may be designed on different directions or shapes, such as circle to move the popcorn through the system of the present invention.

The hopper 38 may be dimensioned to receive a plurality of popped popcorn 30, typically top-loaded therein. A delivery apparatus 16 connected to the hopper 38 may be dimensioned to communicate the popcorn 30 from the hopper 38 into a flavoring enclosure and unto the conveyor belt 12. The delivery apparatus 16 may be tubular chute in certain embodiments. The flavoring enclosure may be formed by a housing 28, wherein the flavoring enclosure is dimensioned and adapted to house the conveyor belt 12. A plurality of spray nozzles 22 may be selectively disposed along an upper portion of the flavoring enclosure so as to be positioned above the conveyor belt 12. Each spray nozzle 22 may be positioned and adapted to provide a spray/mist of liquid flavoring 32 in the direction of the popcorn 30 on the conveyor belt 12. The plurality of spray nozzles 22 may be operatively connected to a liquid flavoring container 24 by a pump 34 and conduit tubing 36 for conveying liquid flavoring to the pump 34, said pump 34 being operable to generate a spray liquid flavoring 32. Each spray nozzle 22 may be adapted to produce the spray/mist along a range of angles so that the liquid flavoring 32 is not just vertically contacting the popcorn 30, providing an even distribution of the liquid flavoring 32 misted onto the exposed surface of the popcorn 30 along the conveyor belt 12. The liquid flavoring 32 may include butter and other liquid flavorings.

Figure 4:
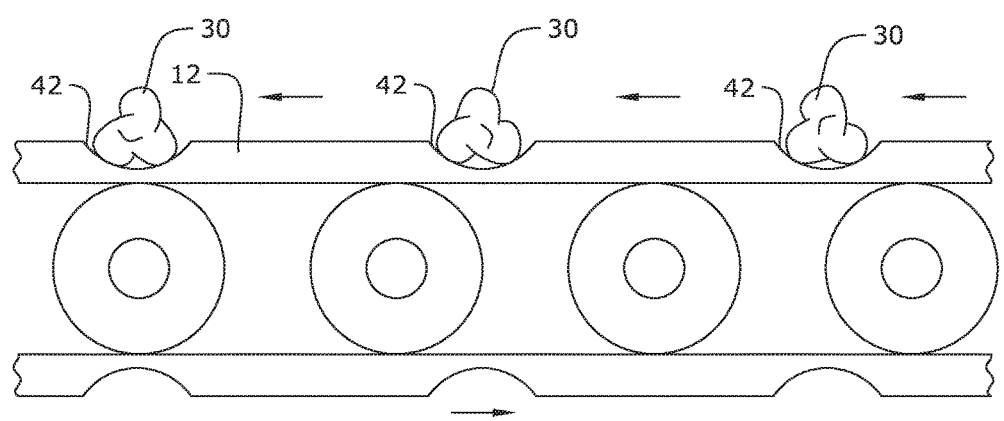
FIG. 4 is a detailed side view of an exemplary embodiment of the present invention.

Disposed between the delivery apparatus 16 and the conveyor belt 12 may be a control mechanism 46 (also known as a pivotable steering member) adapted to selective control the amount and path of the falling popcorn 30, specifically to urge a non-vertical trajectory from the delivery apparatus 16, wherein the control mechanism 46 is selectively movable and securable between an opened position and a closed position. The non-vertical trajectory being important so that the more horizontal direction and diminished rate of movement of the falling popcorn 30 heightens the likelihood of said falling popcorn settling and being retained in the cutout recesses 42 of the conveyor belt 12. In certain embodiments, the control mechanism 46 may be pivotally connected to the housing 28 so as to be disposed between the housing 28 (and the flavoring enclosure/space it defines) and the delivery apparatus 16—at an attachment point 47—for controlling the flow of the popped popcorn 30 between the hopper 38 and the flavoring enclosure (and the conveyor belt it houses). The positioning of the control mechanism 46 may be adapted to prevent the popcorn 30 from grouping together on the conveyor belt 12. Furthermore, the conveyor belt 12 may form a plurality of spaced-apart cutouts 42 along its outward facing surface, as illustrated in FIG. 4. The cutouts 42 may be recesses dimensioned and adapted to receive a single popcorn 30 therein, spacing out the popcorn 30, so as to prevent the popcorn 30 from grouping together on the conveyor belt 12. Furthermore, the cutout recess may be dimensioned so that the outward-facing surface (of the conveyor belt 12) defining the cutout recess 42 is greater than the average circumference of a popped popcorn, thereby exposing greater and/or more surface area of its retained popcorn for exposure to the sprayed/misted liquid flavoring 32. In some embodiments, each recess 42 may be dimensioned to be greater than the circumference of an average popped popcorn by approximately twenty percent, as illustrated in FIG. 4.

In certain embodiments, the control mechanism 46 and the cutout recesses 42 may prevent the popcorn 30 from falling off the conveyer belt 12.

The housing 28 may provide a user interface 18 electronically connected to at least one electronic sensor 26 and the power source 10 and the spray nozzles 22 by a control circuitry 20. The control circuitry 20 may be adapted to control the operation of the plurality of the spray nozzles 22. The electronic sensor 26 may be adapted to sense when the last kernel has been conveyed from the conveyor belt 12 and into the receptacle 44, so that the control circuitry 20 can stop the spray nozzles 22 from spraying. The user interface 18, by way of the control circuitry 20, may be adapted so that a user may operate the present invention.

A method of using the present invention may include the following. The flavoring apparatus 100 disclosed above may be provided. The user may load a predetermined portion of a container of popcorn—i.e., the plurality of popped popcorn 30—into the hopper 38 from its top. Then the user may engage the user interface 18 to operate the control mechanism 46 and conveyor belt 12 so that the loaded popcorn 30 descends under gravity through the delivery apparatus 16 onto the conveyor belt cutouts 42 and under the spray/mist 32 of the plurality of spray nozzles 22 before being conveyed into the receptacle 44 that the user can access for enjoying the flavoring of each popcorn 30.

In addition, this invention would prevent spillage and wastage of the popular snack, which may occur when attempting to coat the popcorn using traditional methods.

It should be understood, of course, that the foregoing relates to exemplary embodiments of the invention and that modifications may be made without departing from the spirit and scope of the present invention.

What is claimed is:

1. A device, comprising:
   a housing defining a flavoring enclosure, the housing having an inlet and a dispensing point;
   a conveyor belt housed in the flavoring enclosure;
   a plurality of spaced-apart recesses provided along an outward facing surface of the conveyor belt, wherein each recess is dimensioned and adapted to retain one popped popcorn therein;
   a pivotable steering member attached to an inner surface of the housing at an attachment point downward of the inlet for selectively directing popped popcorn descending therethrough;
   a plurality of spaced apart spray nozzles for spraying popped popcorn operatively associated with the conveyor belt, each spray nozzle attached along an inner surface of the housing so as to be generally co-planar with the attachment point; and
   a user interface operatively associated with the plurality of spaced apart spray nozzles and the pivotable steering member.

2. The device of claim 1, further comprising a chute operatively associated with the inlet, whereby popped popcorn is fed into the flavoring enclosure.

3. The device of claim 1, wherein the pivotable steering member is movable between a closed position and a range of open positions.

4. The device of claim 3, wherein the range of open positions urges popped popcorn from the delivery apparatus across a range of respective non-vertical trajectories.

5. The device of claim 1, wherein each spray nozzle is selectively moveable between a range of spray angles.

6. The device of claim 1, wherein the conveyor belt operably extends from adjacent the attachment point to adjacent the dispensing point.

7. The device of claim 1, further comprising a receptacle disposed so as to communicate with the dispensing point, whereby popcorn moving along the operable conveyor belt are urged into the receptacle.

8. The device of claim 1, wherein each recess is dimensioned to be greater than a circumference of an average popped popcorn by approximately twenty percent.

* * * * *